United States Patent [19]

Suzuki

[11] Patent Number: 4,792,933
[45] Date of Patent: Dec. 20, 1988

[54] OPTICAL RECORDING/REPRODUCING APPARATUS HAVING DISK LIFETIME ESTIMATING DEVICE

[75] Inventor: Tsutomu Suzuki, Saitama, Japan

[73] Assignee: Pioneer Electronic Corporation, Tokyo, Japan

[21] Appl. No.: 89,452

[22] Filed: Aug. 26, 1987

[30] Foreign Application Priority Data

Aug. 26, 1986 [JP] Japan .................................. 61-199604

[51] Int. Cl.$^4$ ............................................. G11B 17/22
[52] U.S. Cl. ........................................ 369/32; 369/41; 369/54; 369/58; 369/116
[58] Field of Search ................... 369/32, 33, 41, 54, 369/58, 116

[56] References Cited

U.S. PATENT DOCUMENTS 4,611,317 9/1986 Takeuchi et al. ..................... 369/45

FOREIGN PATENT DOCUMENTS

| 57-46353 | 3/1982 | Japan | 360/31 |
| 59-60742 | 4/1984 | Japan | 369/54 |
| 59-98333 | 6/1984 | Japan | 369/116 |
| 59-215076 | 12/1984 | Japan | 369/33 |
| 60-160082 | 8/1985 | Japan | 369/292 |

Primary Examiner—William L. Sikes
Assistant Examiner—Frank González
Attorney, Agent, or Firm—Sughrue, Mion, Zinn, Macpeak & Seas

[57] ABSTRACT

An optical recording/reproducing apparatus capable of accurately estimating the remaining service life of an optical disk without the need for recording large amounts of information on the disk beforehand. At the time of manufacture, the reflection factor in a specified blank portion of the disk is detected and the detected value recorded in a predetermined position on the disk. To estimate the remaining lifetime at a later time, the reflection factor is again detected and compared with the recorded value.

9 Claims, 2 Drawing Sheets

OPTICAL RECORDING/REPRODUCING APPARATUS HAVING DISK LIFETIME ESTIMATING DEVICE

BACKGROUND OF THE INVENTION

The present invention relates to an optical recording/reproducing apparatus in which a disk is irradiated with a laser beam to thereby perform both recording and reproducing of information on the disk.

Recently, various examples of such recording/reproducing systems have become known. Japanese Unexamined Patent Publication No. 61-42735 discloses a method of estimating the lifetime of a disk of a type for which information recording/reproducing is performed by using a change in phase (between crystalline and amorphous) of the material constituting the recording surface of the disk.

According to the method disclosed in this publication, a synchronizing signal is recorded on an outer circumferential track of the disk at initialization. Also during the initialization process, the synchronizing signal is reproduced and the amplitude of the reproduced signal measured and recorded on the disk. After the disk has been placed in service, to estimate its remaining service life at any point in time, the recorded value is read out and compared with the present value of the amplitude of the reproduced signal. When the value of the amplitude of the reproduced signal falls below a predetermined level in comparison with the recorded value of the amplitude at initialization, it is judged that the useful life of the disk is over.

The method, however, has the disadvantage that it is necessary to record predetermined information, such as a synchronizing signal, when initialization is carried out, thereby reducing the area available for other recording. The method has a further disadvantage in that it is impossible to account for deterioration of the recording material of the disk in the period prior to initialization.

SUMMARY OF THE INVENTION

It is therefore an object of the present invention to eliminate the disadvantages in the prior art as described above.

It is another object of the present invention to provide an optical recording/reproducing apparatus in which the reflection factor in a blank portion of a disk is detected and compared with a value of the reflection factor recorded in advance at a predetermined position on the disk.

In order to attain the above objects, according to the present invention, an optical recording/reproducing apparatus is provided which comprises: a pickup for irradiating a disk to perform information recording/reproducing on the disk; means for driving the pickup to a predetermining position including a specified blank portion of the disk; a detection circuit for detecting a reflection factor at the specified blank portion of the disk; and a control circuit for comparing a value of the reflection factor at the specified blank portion detected by the detection circuit with a value of the reflection factor at the same blank portion recorded in advance at a predetermined position on the disk and for indicating a condition in accordance with the result of comparison, such as with a visual display or aurally.

Thus, data related to the reflectance at a specified blank portion is recorded beforehand at a predetermined position on the disk. The reflection factor at the specified blank portion of the disk can be detected whenever desired, and the detected value compared with the value of the reflection factor recorded beforehand in the predetermined position on the disk.

BRIEF DESCRIPTION OF THE DRAWINGS

The above and other objects, features and advantages of the present invention will appear more fully from the following description in conjunction with the accompanying drawings, in which.

DESCRIPTION OF THE PREFERRED EMBODIMENTS

Figure 2:
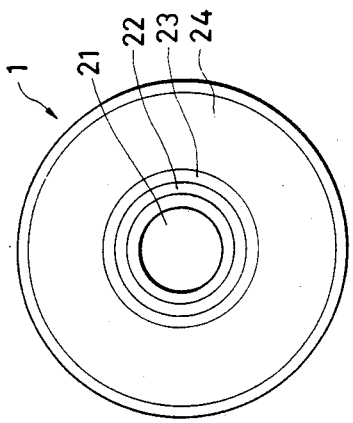
FIG. 2 is a plan view of an optical disk recorded according to the present invention.

FIG. 2 is a plan view of an optical disk 1 recorded in accordance with the present invention. In the disk 1, a control track is formed in a control region 22 of a predetermined width (for example 0.5 mm) and which is located near a central hole 21. A check region 23 is formed outside the control region 22 so that the manufacturer of the disk can record thereon data necessary for various checks, for example, the date of production of the disk, the name of the factory, etc. A user's region 24 (normal recording region) is formed outside the check region 23 in which the user can perform information recording/reproducing as desired.

Alternatively, another control region 22 may also be provided outside the user's region 24, and either one of the control regions 22 may be selectively used as desired.

Figure 1:
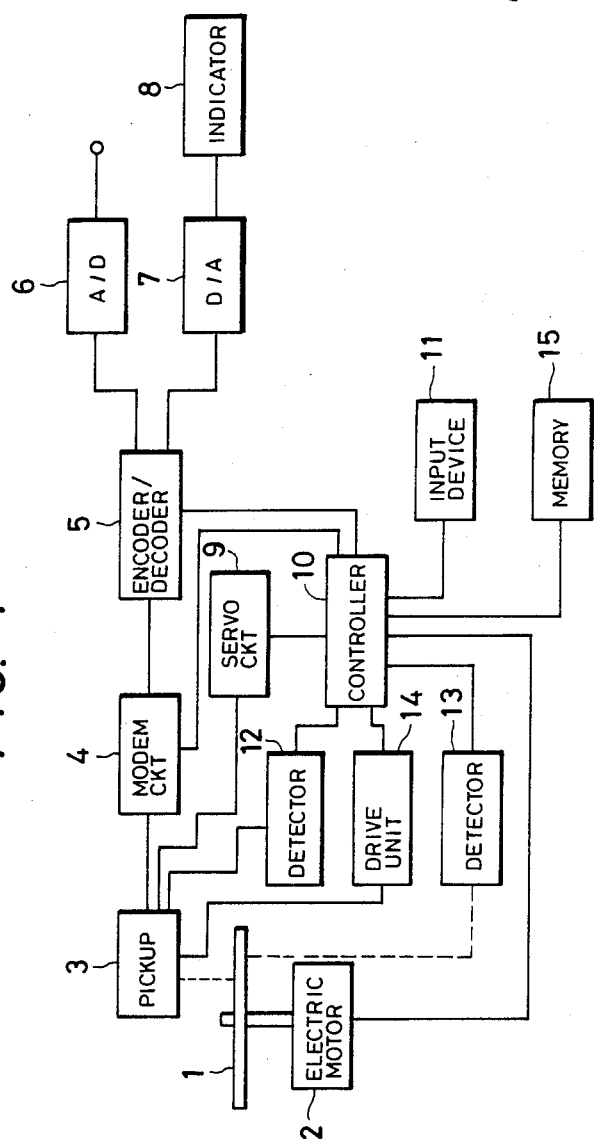
FIG. 1 is a block diagram illustrating an optical recording/reproducing apparatus constructed according to the present invention.

FIG. 1 is a block diagram of an optical recording/reproducing apparatus in which information recording/reproducing is carried out on such a disk 1. As shown in the drawing, an electric motor 2 rotates the disk 1. A pickup 3 irradiates the disk 1 with a laser beam to thereby perform information recording/reproducing on the disk 1. A modulation-demodulation circuit 4 modulates the recording signal (using any desired system) and demodulates the reproduced signal. A encoder/decoder 5 encodes the recording signal and decodes the reproduced signal. An A/D converter circuit 6 transforms the analog recording signal applied thereto into a digital signal. A D/A converter circuit 7 transforms a reproduced digital signal applied thereto into an analog signal, which is in turn applied to an indicator 8 constituted by a speaker, a CRT display, etc. A servo circuit 9 controls the focusing servo and tracking servo of the pickup 3. A control circuit 10 (described below) is constituted, for example, by a microcomputer. An input device 11 directs commands to the control circuit 10. detector circuits 12 and 13 are provided to detect the position of the pickup 3 and the presence of the disk 1, respectively. A drive unit 14 moves the pickup 3 relative to the disk in the radial direction thereof. A memory 15 is provided to store predetermined data.

Figure 3:
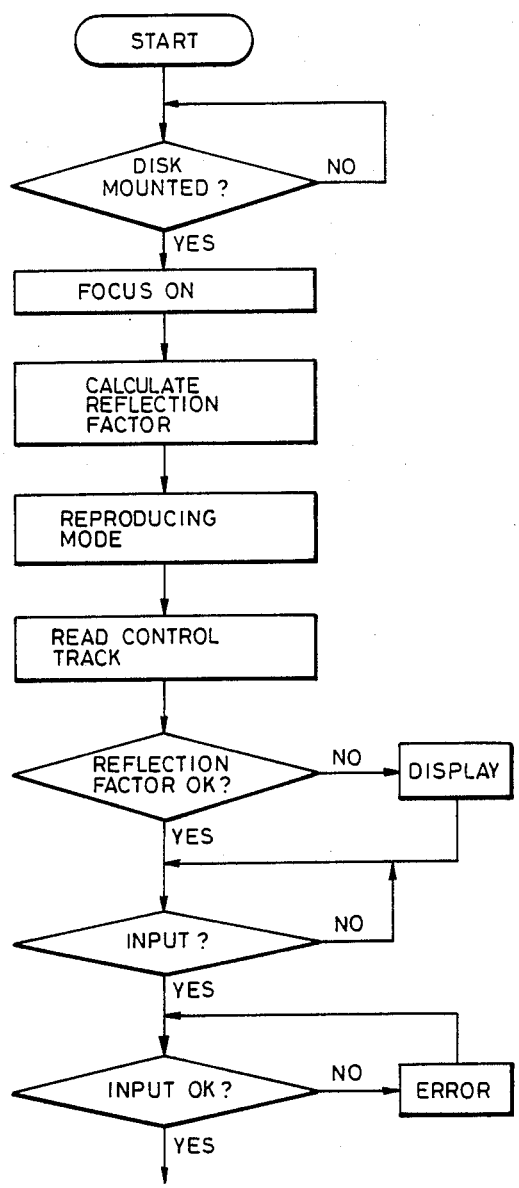
FIG. 3 is a flowchart for explaining the operation of the inventive apparatus.

The operation of the apparatus is carried out, for example, as shown in the flowchart of FIG. 3. If the disk 1 is mounted at the correct position, the detector circuit 13 applies a detection signal to the control circuit 10. Upon reception of this detection signal, the control circuit 10 applies a control signal to the servo circuit 9 to turn on a focusing servo loop. At the same time, the control circuit 10 applies a signal to the drive unit 14 to instruct it to move the pickup 3 to a specified blank portion of the disk 1 when the pickup 3 is located in an area where information has been recorded. The blank portion may be in any position so long as no information has been recorded therein, and may be, for example, a boundary portion inside the control region 22 or outside the user's region 24. Of course, the blank portion may be a position within the control region 22, within the check region 23, within the user's region 24, or anywhere else where substantially no information has been recorded. In the case where a pre-group (lead-in track) is formed to guide the movement of the pickup 3, if no information has been recorded therein, it may be used for the specified blank portion. Generally, the specified blank portion may be any position from which no high-frequency signal is reproduced.

When the pickup 3 is irradiating the specified blank portion with a laser beam, the mean level of reflected light from the specified blank portion is detected by the detector circuit 12, which applies a signal corresponding to the mean detected level to the control circuit 10. The control circuit 10 calculates the reflection factor at the specified blank portion on the basis of the intensity (power) of the light source of the pickup 3 and the output of the detector circuit 12. Of course, the arrangement may be modified such that a part of the light emitted from the light source is received by a photoelectric element provided separately from the photoelectric element detecting the light reflected from the disk 1. The calculated value of the reflection factor is stored in the memory 15.

Upon completion of the measurement of the reflection factor, the control circuit 10 controls the modulation-demodulation circuit 4, the encoder/decoder 5, etc., to set them in the reproducing mode. The control circuit 10 instructs the drive unit 14 to move the pickup 3 to the control region 22 and then causes the pickup 3 to reproduce the data recorded in the control track. The reproduced signal received from the pickup 3 is demodulated by the modulation-demodulation circuit 4 and decoded by the encoder/decoder 5. The reflection factor at the specified blank portion is of course measured in the manner described above and recorded beforehand in the control track during the manufacture of the disk (before the disk is delivered to the user). The control circuit 10 reads the previously recorded reflection factor and compares the read-out value with the present actual value of the reflection factor stored in the memory 15. If the reflection factor has decreased, owing to aging or the like, such that the ratio of the actual value of the reflection factor to the value of the reflection factor at the time of manufacture is equal to or less than a predetermined value, the control circuit 10 applies a signal to the encoder/decoder 5 to cause the encoder/decoder 5 to actuate the indicator 8 through the D/A converter circuit 7 to indicate this condition.

If desired, the indication may be made in a plurality of stages, corresponding to the degree of deterioration of the reflection factor, for example, a first stage in which it is preferable to back-up record the user's data onto another disk, a second stage in which the data cannot be ensured, a third stage in which the disk cannot be used, etc.

In the case where the reflection factor has not fallen below the predetermined value, and if there is no trouble in recording/reproducing information, either no indication at all is given or an indication is given of the soundness of the disk.

After providing an indication, the apparatus is put into a stand-by state waiting for a command from the input device 11. In the case where an input from input device 11 is not proper (for example, when a recording command is entered in spite of the fact that the apparatus is not in a state where recording can be performed, the fact that the input is erroneous (and an additional message requesting replacement of the disk, if necessary) is displayed and a correct input is awaited. Upon reception of a correct input, the input command is executed.

Upon entry of a command for a recording operation, the analog recording signal applied to the A/D converter circuit 6 is converted into a digital signal, which is then encoded by the encoder/decoder 5. The encoded signal is modulated by the modulation-demodulation circuit 4 and then supplied to the pickup 3 so as to be recorded in the user's region 24 in a predetermined position thereof.

Upon entry of a command for a reproducing operation, the signal reproduced by the pickup 3 from the user's region 24 is demodulated by the modulation-demodulation circuit 4 and then decoded by the encoder/decoder 5. The decoded signal is converted into an analog signal by the D/A converter circuit 7 so as to drive the indicator 8.

The data regarding the reflection factor to be recorded on a disk may be a ratio of reflected light to incident light. In the case where the quantity (intensity) of incident light is standardized to a fixed value, the data regarding the reflection factor may merely indicate directly the level of the reflected light. Moreover, a modification may be made whereby the user may store this data when the user starts to use the disk.

The present invention is applicable to any kind of disk, including a disk used only for reproduction, a disk for which recording as well as reproduction can be carried out even though erasing cannot be performed, a disk for which not only recording and reproduction but also erasing can be performed, etc. That is, the invention is applicable regardless of the type of the recording material of the disk. It is apparent that the invention is applicable also to a disk for which the reflection factor generally increases over time because the recording surface material of the disk becomes more crystalline over time. In this case, however, an indication should be made when the reflection factor ratio becomes equal to or larger than a predetermined value (rather than equal to or less than a predetermined value).

With the invention is described above, not only can the remaining life of a disk be accurately estimated without recording excessive information on the disk, but also dirt or the like can be detected. Further, deterioration of a disk can be detected prior to first use of the disk.

What is claimed is:

1. An optical recording/reproducing apparatus comprising:
   a pickup for irradiating a disk to perform information recording/reproducing on said disk;
   means for driving said pickup to a predetermined position including a specified blank portion of said disk;
   a detector circuit for detecting a reflection factor at said specified blank portion of said disk;

means for comparing a value of said reflection factor at said specified blank portion detected by said detector circuit with a value of the reflection factor at said specified blank portion recorded in advance at a predetermined position on said disk; and means for indicating a condition in accordance with a result of said comparing by said comparing means.

2. The optical recording/reproducing apparatus of claim 1, further comprising a memory for storing said value of said reflection factor recorded in advance.

3. The optical recording/reproducing apparatus of claim 1, wherein said indicating means produces an indication when said value of said reflection factor detected by said detector circuit is equal to or less than a predetermined value.

4. The optical recording/reproducing apparatus of claim 1, wherein said indicating means produces an indication when said value of said reflection factor detected by said detector circuit is equal to or greater than a predetermined value.

5. The optical recording/reproducing apparatus of claim 1, wherein said indicating means produces respective indications when said value of said reflection factor detected by said detector circuit is within predetermined ranges corresponding to respective conditions of said disk.

6. The optical recording/reproducing apparatus of claim 1, wherein the condition indicated by said indicating means is indicative of whether said disk is usable or not in terms of its service life.

7. The optical recording/reproducing apparatus of claim 6, wherein the condition indicated by said indicating means indicates that it is preferable to back-up record data on said disk onto another disk.

8. The optical recording/reproducing apparatus of claim 6, wherein the condition indicated by said indicating means indicates that data on said disk cannot be ensured.

9. The optical recording/reproducing apparatus of claim 6, wherein the condition indicated by said indicating means indicates that said disk cannot be used.

* * * * *